United States Patent [19]
Carmien

[11] Patent Number: 5,632,837
[45] Date of Patent: *May 27, 1997

[54] PULTRUSION PROCESS FOR MANUFACTURING COMPOSITE ROD ASSEMBLIES

[76] Inventor: Joseph A. Carmien, 525 N. Maple Dr., Beverly Hills, Calif. 90210

[*] Notice: The term of this patent shall not extend beyond the expiration date of Pat. No. 5,421,931.

[21] Appl. No.: 452,159

[22] Filed: May 26, 1995

Related U.S. Application Data

[63] Continuation-in-part of Ser. No. 45,464, Apr. 8, 1993, Pat. No. 5,421,931, which is a continuation-in-part of Ser. No. 732,042, Jul. 18, 1991, abandoned.

[51] Int. Cl.$^6$ ............................ B31C 5/00; B29C 47/00
[52] U.S. Cl. .................................. 156/172; 156/433
[58] Field of Search .......................... 16/110 R, 111 R, 16/DIG. 18; 81/489, 492; 294/57; 156/166, 169, 172–173, 180, 242, 244.11, 244.15, 244.25, 245, 433, 441, 500, 553, 580, 581, 583.3, 583.5; 425/190, 192 R, 382.3; 264/135–137

[56] References Cited

U.S. PATENT DOCUMENTS

| | | |
|---|---|---|
| Re. 32,364 | 2/1987 | Carmien . |
| T101,401 | 1/1982 | Zion . |
| 2,571,717 | 10/1951 | Howald et al. ............... 156/180 X |
| 3,291,878 | 12/1966 | Boggs . |
| 3,378,884 | 4/1968 | Meteer . |
| 3,567,541 | 3/1971 | Kaczerginski . |
| 3,619,009 | 11/1971 | O'Leary ...................... 294/57 X |
| 4,063,838 | 12/1977 | Michael . |
| 4,236,386 | 12/1980 | Yates et al. ................. 156/172 X |
| 4,238,540 | 12/1980 | Yates et al. ................. 156/172 X |
| 4,300,321 | 11/1981 | Preis et al. . |
| 4,440,593 | 4/1984 | Goldsworthy . |
| 4,469,541 | 9/1984 | Goldsworthy . |
| 4,570,988 | 2/1986 | Carmien . |
| 4,605,254 | 8/1986 | Carmien . |
| 4,639,029 | 1/1987 | Kolonia ........................ 294/57 |
| 4,673,541 | 6/1987 | Watanabe et al. . |
| 4,739,536 | 4/1988 | Bandera et al. ............ 16/111 R |
| 4,752,313 | 6/1988 | Allaire et al. . |
| 4,770,834 | 9/1988 | Nakasone et al. ......... 156/180 X |
| 4,772,438 | 9/1988 | Watanabe et al. . |
| 4,803,819 | 2/1989 | Kelsey . |
| 4,820,366 | 4/1989 | Beever et al. . |
| 5,264,060 | 11/1993 | Lambing et al. ........... 156/166 X |
| 5,421,931 | 6/1995 | Carmien ..................... 156/172 |

FOREIGN PATENT DOCUMENTS

| | | | |
|---|---|---|---|
| 2831318 | 2/1979 | Germany | 156/244.15 |

*Primary Examiner*—Michael W. Ball
*Assistant Examiner*—Michael A. Tolin
*Attorney, Agent, or Firm*—Kelly, Bauersfeld, Lowry & Kelley

[57] ABSTRACT

A process for manufacturing a composite rod assembly that may be used, for example, as a tool handle includes the steps of feeding a core into a pultrusion die tube and surrounding the core with resin coated fibers. At least one external mold member having a mold face defining an irregular profile shape is inserted into a space between the resin coated fibers and the die tube. The core is pulled through the pultrusion die tube and the at least one external mold member is drawn through the die tube with the resin coated fibers and the core. The resin coated fibers are cured around the core to form a fiber-resin jacket having an outer surface conforming to the irregular profile shape of the mold face. The core itself may have an irregular profile shape so that an inner surface of the fiber-resin jacket conforms thereto to key-lock the fiber-resin jacket to the core. A secondary jacket may be molded over at least a portion of the outer surface of the fiber-resin jacket so that an inner surface of the secondary jacket conforms to the outer surface of the fiber-resin jacket to key-lock the secondary jacket to the fiber-resin jacket. The at least one external mold member may be removably attached to a belt that is guided through a track within the die tube.

37 Claims, 6 Drawing Sheets

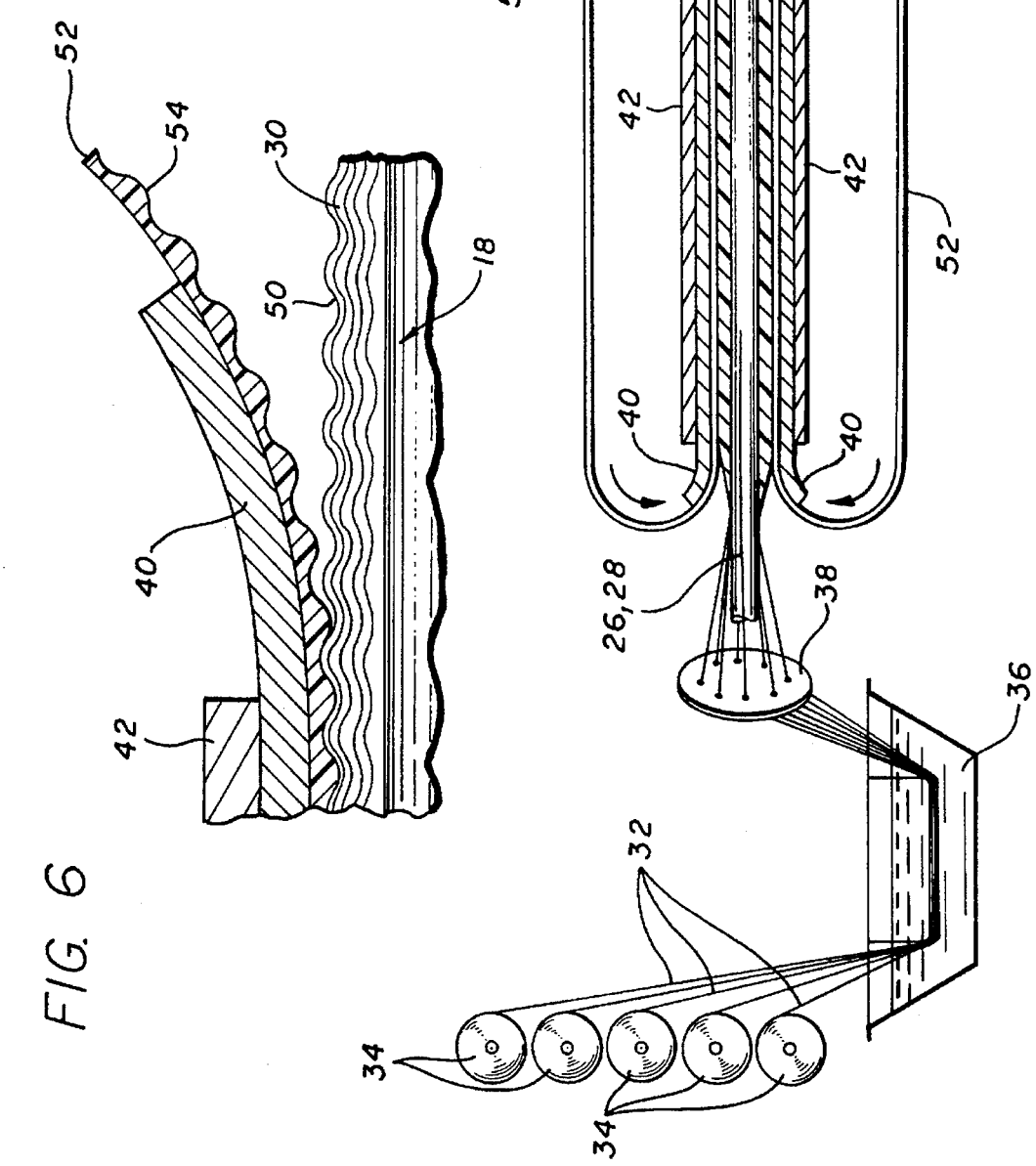

PULTRUSION PROCESS FOR MANUFACTURING COMPOSITE ROD ASSEMBLIES

RELATED APPLICATIONS

This is a continuation-in-part of U.S. patent application Ser. No. 08/045,464, filed Apr. 8, 1993 (U.S. Pat. No. 5,421,931), which is a continuation-in-part of U.S. patent application Ser. No. 07/732,042 filed Jul. 18, 1991 (abandoned).

BACKGROUND OF THE INVENTION

This invention relates generally to continuous profile molding methods and products. More particularly, the present invention relates to processes for manufacturing composite rod assemblies that may be used, for example, as tool handles, having a construction which significantly increases the strength of such rod assemblies without a significant corresponding increase in weight.

Continuous profile molding is generally known as pultrusion in the thermosetting field and extrusion in the thermoplastic field. The process of pultrusion involves the manufacture of articles having a continuous profile of a single selected cross-section matching that of a die. Usually the manufactured article comprises a thermosetting type resin (i.e., polyesters, epoxies, phenolics, etc.), reinforced with such materials as glass fibers, Boron, Kevlar, hemp, cotton, sisal, etc. Pultrusion manufacturing processes have a tremendous number of applications, but there is also a significant limitation, i.e., the articles produced have only one continuous profile (round, square, hollow, channel, etc.) in cross-section. The only modification to that cross-section will occur after the product has exited from the die by such means as grinding, cutting, drilling and/or sawing, all of which add substantial cost to the end product as well as generally degrading the initial pultrusion or molding as it pertains to its physical properties. To modify a cross-section by one of the above mentioned operations, one must remove by grinding, drilling, etc., some of the material already used to produce the original product. In doing so the reinforcing material (glass fiber) is cut, ruptured or abraided. Thus, several undesirable things take place: (1) cost for labor and/or equipment are increased; (2) there is a degradation of the finished product; and (3) raw material originally used to make the full cross-section or profile of the article is wasted. An additional and usually more expensive manner by which the cross-section or profile of the pultruded article can be modified is to mold or machine additional collars or adapters of plastic or metal materials which can then be attached to the original cross-section profile by bonding, riveting, screwing or otherwise attaching the collar or adapter to provide a different cross-section in a desired location.

In recent years pultrusion manufacturing processes have been adapted to manufacture composite rod assemblies that may be used as handles for hand tools such as a shovels, rakes, hoes and the like. The basic technique for running filaments through a resin bath and then through an elongated heated die tube to produce a cured composite rod of the same shape as the die tube has been known for some time. See, for example, U.S. Pat. Nos. 2,948,649 and 3,556,888. This method, however, produces a solid extruded product which is unacceptably heavy and/or too rigid for many tool handle applications. The weight problem can be alleviated by means of an existing process to extrude hollow tubes utilizing a die tube with the center filled, leaving an annular cross-section through which the resin coated fibers are pulled. This weight reduction is achieved, however, at the cost of significantly reduced bending or flexural strength in comparison with a solid rod, resulting in a tool handle which would not be suitable for use in certain high-stress applications such as general purpose shovel handles. Further, to increase interlaminar strength of the tube forming fibers, a substantial percentage of fibers running other than in a longitudinal direction have been thought to be required.

The bending strength of tool handles can be improved by producing fiber-resin rods which are substantially hollow or lightweight throughout a major portion of their length, but reinforced at areas of expected high stresses during tool use. Such improved tool handles and related methods are shown in U.S. Pat. No. 4,570,988, the contents of which are incorporated herein by reference. These composite tool handles have further been improved by the introduction of one or more reinforcing beads of fiber-resin material extending the length of the load-bearing rod. Such tool handles are shown in U.S. Pat. No. 4,605,254, the contents of which are incorporated herein by reference.

Although such above-described composite tool handles are generally superior to wooden handles, the competitive pressures of the marketplace have encouraged tool handle manufacturers to seek new processes, materials and construction techniques to further increase the strength of composite tool handles without introducing additional weight and/or cost to the handle. In this regard, it is important to permit use of the most economical glass fibers and the most reasonably priced resins to produce a product that has the greatest value to the end user. However, common glass fibers and resins have physical properties which are often less desirable when utilized in a composite tool handle than other more exotic and costly fibers and resins. Accordingly, one objective is to obtain higher mechanical strength properties in a composite material tool handle while permitting the manufacturer to use relatively less costly materials.

It is well known that utilizing unidirectional strands of resin coated glass fibers in a pultrusion process is the most economical process for manufacturing a composite rod assembly. In many cases glass fibers such as a fabric mat veil have been introduced into the pultrusion process to reduce interlaminar failure or to increase the hoop strength of the rod assembly by providing cross-fibers within the cured fiber-resin composite load-bearing jacket. The use of cross-fibers, however, typically and undesirably increases the costs associated with manufacture of composite rod assemblies and decreases tensile strength along the length thereof. Thus, to increase interlaminar and hoop strength of the composite rod assembly, some tensile and flexural strength is sacrificed.

Stress testing of composite rod assemblies has revealed several common characteristics as they fail under increasing loads. When a flexure load is applied perpendicularly to the longitudinal axis of a composite rod assembly, the first failure usually occurs very close to the center of mass perpendicular to the applied load and extending longitudinally through the rod assembly. This failure is in shear, between the fibers of the resin. Following this initial shear failure, the rod assembly is then separated into two relatively equal half sections which perform as independent units at half the overall load-bearing value of the original composite rod assembly. As the load is increased further, the next failure occurs as a compression failure in the bottom half of the original section of the rod assembly. Composite rod assemblies are far stronger in tension (due to the strength characteristics of the fiber materials), whereas the compressive loads are borne almost entirely by the interfiber resinous material.

One method of reducing the shear failure problem noted above is to mold a cladding material over at least a portion of the outer surface of the manufactured rod assembly where the greatest stresses are likely to occur. It is often desirable, however, to mold a thermoplastic cladding material over the composite rod assembly which, due to the inherent physical properties of commonly used thermoplastic materials, can present additional manufacturing difficulties. In this regard, composite rod assemblies utilizing fiberglass as a strength member have a perfect elastic memory which causes the rod assembly to return to its normal shape after an infinite number of flexes. Further, within its limits, fiberglass has virtually no cold flow. When a thermoplastic molding is provided over a composite rod, the thermoplastic material provides the desired cosmetic look and the bulk to properly fit a user's hand. Use of thermoplastic materials alone to manufacture many types of composite rod assemblies, including tool handles, is not desirable because of the thermoplastic material's inherent low strength.

There is a wide range of thermoplastics available for use as a cladding over composite rod assemblies. These materials range in price from a few pennies per pound to several dollars per pound. Under circumstances where the physical properties of the thermoplastic material are not critical when molded over a composite rod assembly, it is, therefore, desirable to find the most economical material to produce the desired article. When a product such as a sledge handle or a shovel handle 36 inches to 48 inches long has a relatively heavy thermoplastic cladding molded over it, shrinkage occurs that can be as high as 0.010 to 0.015 inch per inch. Thus, if the cladding completely encapsulated the composite rod assembly, the shrinkage would be of such magnitude that the stresses within the cladding material will exceed its tensile strength and simply break apart.

Accordingly, there has been an on-going need for improved composite rod assemblies and related manufacturing processes to provide significantly increased tensile and flexural strength without a corresponding increase in the weight thereof. Such a manufacturing process preferably permits use of relative low-cost fiber and resin materials, and utilizes unidirectional fibers in a pultrusion manufacturing process. Additionally, there exists a need for a composite rod assembly having increased interlaminar and hoop strength without the use of cross-fibers. Further, a manufacturing process is needed which is compatible with prior techniques for localized strengthening of composite rod assemblies, as by, for example, the use of alternating sections of lightweight filler core and strong reinforcing core within a composite load-bearing jacket, and the use of longitudinally extending reinforcing beads. Moreover, a novel composite rod assembly is needed which has greatly improved resistance to shear failure through the resin, as exhibited in prior composite rod assemblies, and which can accommodate use of relatively inexpensive thermoplastic materials. The present invention fulfills these needs and provides other related advantages.

SUMMARY OF THE INVENTION

The present invention resides in an improved process for manufacturing a composite rod assembly that may be used, for example, as a tool handle, and a pultrusion die molding system for making such composite rod assemblies. The manufacturing process comprises, generally, feeding resin coated fibers into a pultrusion die tube and inserting at least one external mold member having a mold face defining an irregular profile shape into a space between the resin coated fibers and the die tube. The least one external mold member is drawn through the die tube with the resin coated fibers which are then cured within the die tube to form a cured fiber-resin rod having an outer surface conforming to the irregular profile shape of the mold face.

In a preferred form of the invention, a core is fed into the pultrusion die tube which is surrounded by the resin coated fibers. Alternate sections of lightweight filler core and relatively strong reinforcing core may be utilized. The external mold member cooperates with the cores to form a fiber-resin jacket with a substantially uniform cross-sectional area along the length of the rod assembly, and the external mold member is removed from the rod assembly at an exit end of the die tube.

The core or core sections may have an irregular profile shape. In this instance, the resin coated fibers are cured around the core or core sections to form a fiber-resin jacket having an inner surface which conforms to the irregular profile shape of the core or core sections to key-lock the fiber-resin jacket to the core.

A secondary jacket may be molded over at least a portion of the outer surface of the fiber-resin jacket. This results in an inner surface of the secondary jacket conforming to the outer surface of the fiber-resin jacket to key-lock the secondary jacket to the fiber-resin jacket. As illustrated, the secondary jacket includes a reinforcing tip molded onto the fiber-resin jacket to strengthen the rod assembly at one end thereof. The secondary jacket may also include a grip molded onto the fiber-resin jacket adjacent to the reinforcing tip.

The outer surface of the fiber-resin jacket may be formed to have a corrugated profile shape. The corrugations in the corrugated profile shape may be in a sinusoidal configuration wherein each corrugation is about 0.030 inch deep and about 1.125 inch long.

In one illustrated embodiment of the invention, the at least one external mold member is attached to a belt that is drawn through the die tube. The die tube provides a channel-like track which guides the belt therethrough. When a pair of oppositely disposed belts are utilized, the at least one external mold member comprises a plurality of mold members which cooperatively surround the resin coated fibers within the die tube. The belt may be formed in a continuous loop, and the external mold members may be removably attachable to the belt.

A pultrusion die molding system for making a composite rod assembly comprises, generally, a pultrusion die tube, a core insertable through the die tube, means for pulling resin coated fibers in surrounding relation to the core through the die tube, and at least one external mold member having a mold face defining an irregular profile shape, inserted into the die tube at a position disposed between an inner surface of the die tube and the resin coated fibers. The external mold member is drawn through the die tube with the resin coated fibers and the core, and the resin coated fibers are cured upon passage through the die tube to form a fiber-resin jacket having an outer surface conforming to the irregular profile shape of the mold face. The external mold member is removable from the jacket at an exit end of the die tube.

In a preferred form of the pultrusion die molding system, the at least one external mold member comprises at least one mold insert belt formed in a continuous loop. The at least one external mold member may comprise a plurality of mold members cooperatively surrounding the resin coated fibers within the die tube. Moreover, the external mold member may cooperate with the core to form the fiber-resin jacket with a substantially uniform cross-sectional area along the length of the rod assembly.

Means are provided for molding a secondary jacket over at least a portion of the external surface of the fiber-resin jacket, whereby an inner surface of the secondary jacket conforms to the outer surface of the fiber-resin jacket to key-lock the secondary jacket to the fiber-resin jacket.

The core may include an external surface having an irregular profile shape, whereby the fiber-resin jacket has an inner surface which conforms to the irregular profile shape of the core to key-lock the fiber-resin jacket to the core. The irregular profile shape of the core may comprise a corrugated profile shape of a sinusoidal configuration.

In an illustrated embodiment, the external mold members are attached to a belt that is drawn through the die tube with the resin coated fibers and the core. The external mold members are detachable from the belt, and the die tube includes a track through which the belt slides. When two oppositely disposed belts are utilized, the at least one external mold member comprises a plurality of mold members which cooperatively surround the resin coated fibers within the die tube.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 5 is a schematic representation of a pultrusion machine adapted to perform a manufacturing process of the present invention;

FIG. 6 is an enlarged fragmented and partially sectional view of the area indicated by the encircled region 6 in FIG. 5, showing the manner in which a mold insert belt is utilized to give the outer surface of the load-bearing jacket an irregular profile shape;

FIG. 7 is a fragmented perspective view which further illustrates separation of the mold insert belt from the fiber-resin jacket;

DETAILED DESCRIPTION OF THE PREFERRED EMBODIMENTS

Figure 1:
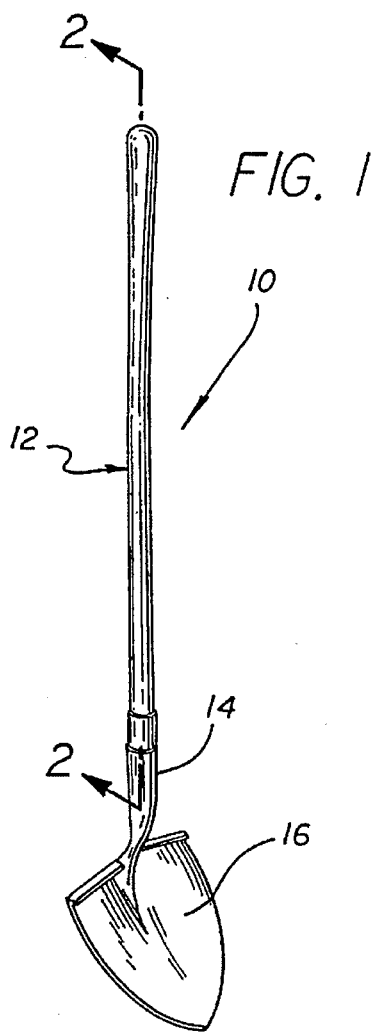
FIG. 1 is a perspective view of the shovel having a tool handle manufactured in accordance with one feature of the present invention.
Figure 3:
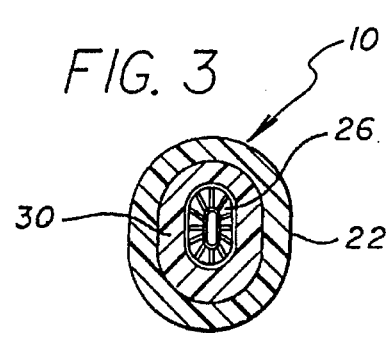
FIG. 3 is a horizontal section taken generally along the line 3—3 of FIG. 2.
Figure 4:
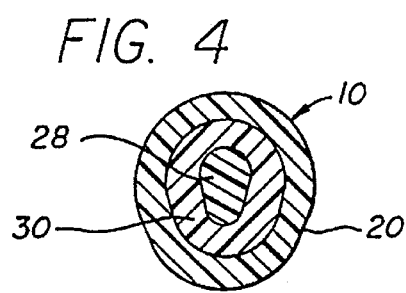
FIG. 4 is a horizontal section taken generally along the line 4—4 of FIG. 2.
Figure 2:
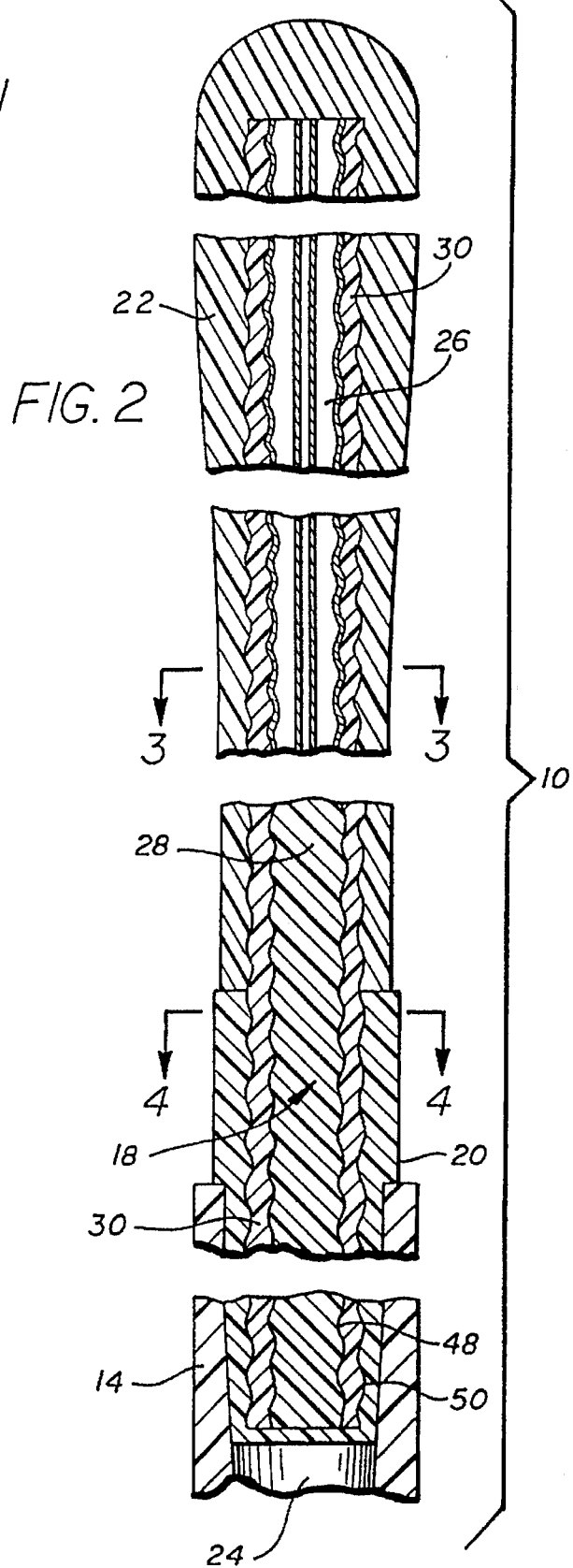
FIG. 2 is an enlarged fragmented sectional view taken generally along the line 2—2 of FIG. 1, illustrating construction of the tool handle to include alternating sections of a lightweight filler core and a reinforcing core surrounded by a load-bearing fiber-resin jacket, wherein the cores and the fiber-resin jacket are key-locked together during a pultrusion manufacturing process, and further illustrating placement of a secondary or outer jacket in the form of a reinforcing tip over one end of the fiber-resin jacket, which is inserted into a socket of the shovel blade, and a grip extending upwardly from the reinforcing tip.

As shown in the drawings for purposes of illustration, the present invention is concerned with an elongate composite rod assembly forming a novel composite tool handle, generally designated in the accompanying drawings by the reference number 10. The tool handle 10 comprises a component of a shovel 12 when inserted into a socket 14 of a shovel blade 16. The tool handle 10 of the present invention exhibits superior flexural strength in comparison with wooden handles and prior fiber-resin composite tool handles, without increasing the weight of the handle itself.

In accordance with the present invention, and as illustrated with respect to an exemplary shovel handle in FIGS. 1–4, the tool handle 10 comprises a load-bearing rod 18 having molded thereon a reinforcing tip 20 at a front end thereof, and a grip 22 situated adjacent to the reinforcing tip and extending rearwardly over the remainder of the load-bearing rod. The reinforcing tip 20 and the grip 22 generally ensheathe the load-bearing rod 18. The reinforcing tip 20 is configured for insertion into the socket 14 of the shovel blade 16, and is secured therein by any suitable conventional means. A socket filler plug 24, such as that shown and described in U.S. Pat. No. Re. 32,364, extends from the front end of the reinforcing tip 20 into the shovel socket 14 to prevent compressive failure of the socket.

The load-bearing rod 18 is manufactured by a pultrusion process (schematically illustrated in one preferred form in FIGS. 5 and 6), and includes alternating sections of lightweight filler core 26 and reinforcing core 28 surrounded by a cured fiber-resin jacket 30. The reinforcing core 28 is preferably located within the fiber-resin jacket 30 at those points where the greatest flexural stresses on the tool handle 10 are anticipated during normal tool use. The lightweight filler core sections 26 extend through the remainder of the load-bearing rod 18 to minimize the weight of the tool handle 10. In the exemplary drawings, a reinforcing core section 28 is shown within the front end of the load-bearing rod 18 which is inserted into the shovel socket 14. By contrast, the lightweight core sections 26 are shown to extend through the remainder of the rod 18.

The outer surface of the reinforcing core 28 and, if desired, all or a portion of the outer surface of each lightweight filler core 26 is provided with an irregular longitudinal profile to permit the fiber-risen jacket 30 to be key-locked to the cores. Similarly, in the referenced preferred form of the invention, the outer surface of the fiber-resin jacket 30 is also provided with an irregular longitudinal profile such as a corrugation formed along at least a portion of its length to permit the reinforcing tip 20 and/or the grip 22 to be key-locked to the load-bearing rod 18. By key-locking the laminate interfaces of the tool handle 10 in the manner shown, resistance to flexural stress-induced failure is significantly increased. It has been found that a composite tool handle 10 utilizing key-locks between adjacent layers of materials are far less likely to fail than tool handles manufactured in accordance with standard manufacturing processes. As illustrated best in FIGS. 2 and 6, the corrugations provided on the cores 26 and 28, and on the outer surface of the fiber-resin jacket 30 are sinusoidal in shape. In this configuration, the typical corrugation is approximately 1.125 inch long and approximately 0.030 inch deep. The present invention, however, is not limited to this specific type of corrugation, but includes various types of irregular profiles which permit adjoining layers of the tool handle to be key-locked together. Importantly, for optimum strength in a tool handle or the like formed by pultrusion, it is desirable for the cross-sectional area of the load-bearing fiber-resin jacket 30 to remain substantially constant.

The composite tool handle 10 is manufactured in accordance with a novel pultrusion process illustrated schematically, in part, in FIGS. 5 and 6. More specifically, to manufacture the load-bearing road 18, a fiber material 32 is drawn off a series of spools or bales 34, then passed through a resin bath 36, and through a carding disc 38 into a pultrusion die tube 40 where the fibers surround alternating sections of the lightweight filler and reinforcing cores 26 and 28. The resin coated fibers 32 are pulled through the die tube 40, and are heated and cured about the cores 26 and 28 by a conventional conduction heater or a microwave heating element 42, which surrounds the die tube. The cured rod 18, consisting of the fiber-resin jacket 30 surrounding the core sections 26 and 28, is pulled out of the die tube 40 by tractor-type pullers 44 and cut into the desired length by a conventional cutting device 46.

Preferably, each reinforcing core 28 and at least a portion of each lightweight filler core 26 has corrugations 48 or the like formed into their respective outer surfaces prior to being drawn through the die tube 40. The resin coated fibers 32, which when cured form the fiber-resin jacket 30, are shaped under heat and pressure to fill-in the spacing between adjacent corrugations to key-lock the fiber-resin jacket 30 to the cores 26 and 28.

A selected irregular profile such as corrugations 50 is imparted to the fiber-resin jacket 30 by feeding one or more external mold members 52 through the pultrusion die tube 40, within the space between the internal die tube surface and the outer surface of the jacket 30. FIGS. 6 and 7 show the external mold members 52 in the form of a pair of mold insert belts each having a generally semicircular cross section to cooperatively encircle and thus enclose the fibers 32 as they are pultruded through the die tube. The two mold insert belts 52 have concave faces 54 defined by a longitudinally extending sequence of regular corrugations 50, resulting in formation and curing of the outer surface of the jacket 30 in conformance with the corrugations 50. FIGS. 6 and 7 further illustrate separation of the belts 52 from the rod 18 at the exit end of the pultrusion die tube 40. In this regard, the belts 52 may be fed intermittently through the die tube 40, or in a continuous loop as shown in FIG. 5.

The mold insert belts 52 include a non-skid backing to permit them to slide easily along the surfaces of the die tube 40, and the facing surfaces 54 are formed to be nonreactive with the resin coated fibers forming the fiber-resin jacket 30. Under some conditions, it may be desirable to treat the facing surfaces 54 of the mold insert belts 52 with a release agent to ensure that the belts are easily separated from the fiber-resin jacket 30 of the load-bearing rod 18 as it exits the die tube 40.

The resultant load-bearing rod 18 manufactured as described in connection with FIGS. 5 and 6 has significantly greater resistance to flexural stresses imposed thereon than similar load-bearing rods which do not have the facing laminate portions key-locked together. Provision of the cores 26 and 28 having outer corrugations ensures that the fiber-resin jacket 30 will be key-locked to the cores. The use of the mold insert belts 52 provide outer corrugations on the fiber-resin jacket 30, which permits a secondary jacket comprising the reinforcing tip 20 and the grip 22 to be molded thereon in a manner which key-locks each to the load-bearing rod 18.

Figure 8:
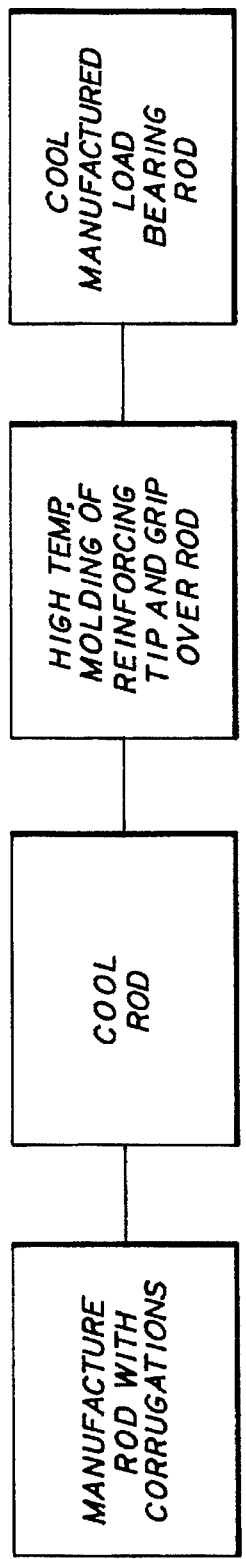
FIG. 8 is a block diagram flow chart illustrating a sequence of process steps in accordance with the invention.

As mentioned previously, and with reference to the flow chart of FIG. 8, the reinforcing tip 20 and the grip 22 are molded over the load-bearing road 18. In particular, the rod 18 is initially cooled, followed by application of the tip 20 and grip 22 as by injection molding or the like. The material forming the reinforcing tip 20 and the grip 22 comprises a thermoplastic or the like which is injection molded in a flowable state at a temperature on the order of about 350°–500° F. The heated thermoplastic material is cooled and cured on the jacket 18, essentially in the form of a secondary or outer jacket, wherein the cooled tip 20 and grip 22 may undergo significant shrinkage on the rod 18 and thus compressively engage the rod to enhance the key-lock effect.

The reinforcing tip 20 is shown in a configuration suitable for insertion into the socket 14 of the shovel blade 16. The reinforcing tip 20 should be highly resistant to the bending stresses exerted upon the shovel handle 10 at its attachment to the shovel blade 16, and preferably is formed of a glass-filled nylon material. The grip 22 is preferably molded into a desired shape from any material which is strong and yet comfortably handled by a user. The grip 22 primarily serves as a convenient surface by which the user can grasp the tool handle 10. When key-locked to the load-bearing rod 18, however, it does provide substantially increased strength to the tool handle 10 rearwardly of the reinforcing tip 20.

FIGS. 9–12 illustrate modified external mold members 152 which are channeled through the pultrusion die tube 40 to impart a selected irregular profile shape to the outer surface of the load-bearing jacket 30 of the rod 18. In this regard, for sake of convenience and ease of description, components generally conforming to those shown and described with respect to FIGS. 1–7 will be identified by the same reference numbers.

Figure 9:
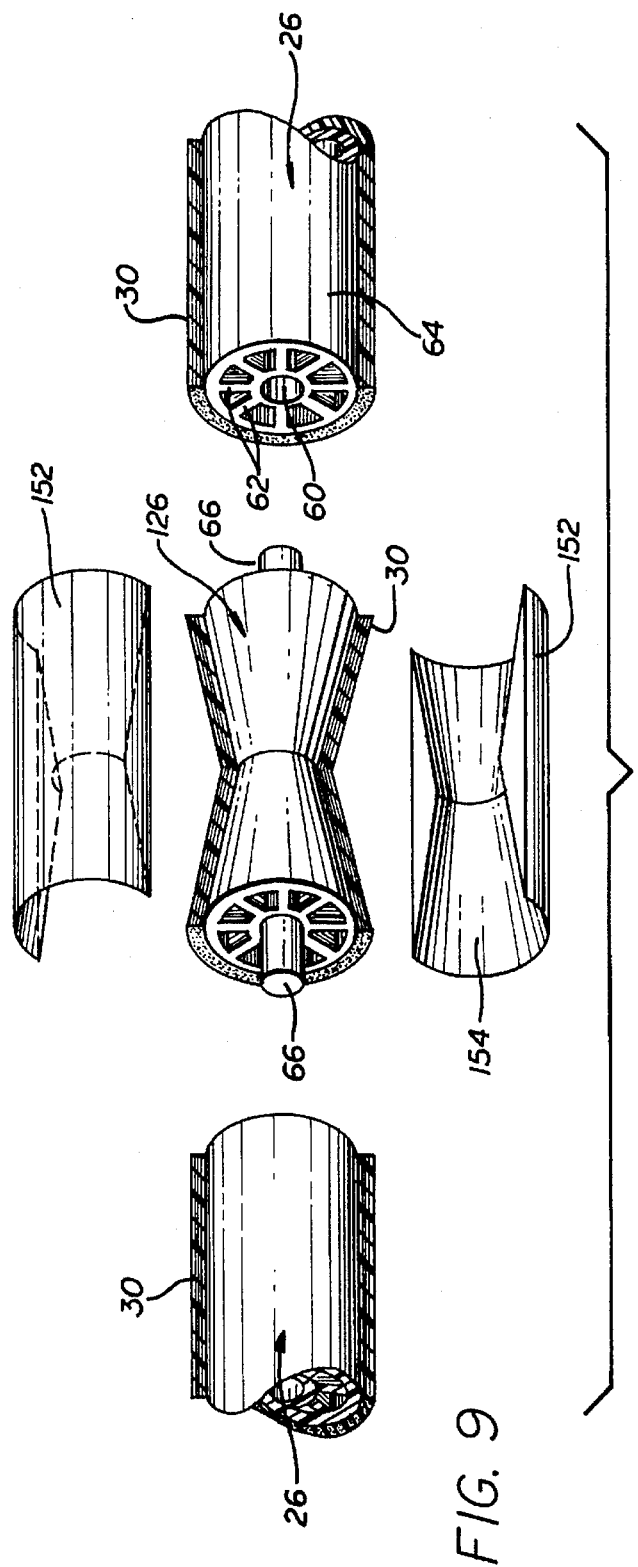
FIG. 9 is an exploded and partially fragmented perspective view showing assembly of alternative external mold members with the core and resin coated fibers to shape the outer surface of the load-bearing jacket.

More specifically, FIG. 9 shows a pair of the lightweight filler core sections 26 adapted for insertion as previously described into the pultrusion die tube 40, with the resin coated fibers 32 channeled into the die tube in surrounding relation to the core sections 26. These filler core sections are depicted with a so-called wagon wheel cross section defined by a central hub 60 joined by spokes 62 to an outer cylinder 64 having a substantially smooth-surfaced or constant longitudinal profile.

At selected locations along the length of the tool handle to be constructed, a modified filler core 126 is inserted in-line with the other core sections forming the rod 18. The modified core section 126 (FIG. 9) also has a wagon wheel type cross section and may include axially protruding connector pins 66 for slide-fit reception into the hubs 60, for example, of adjacent core sections 26. Importantly, the outer surface of the modified filler core 126 presents an irregular profile such as a tapered geometry shown in FIG. 9 to expand in diameter from a longitudinally centered location toward opposite ends of the core section. Other longitudinally irregular profile configurations may be used, such as a corrugated surface or the like.

Figure 10:
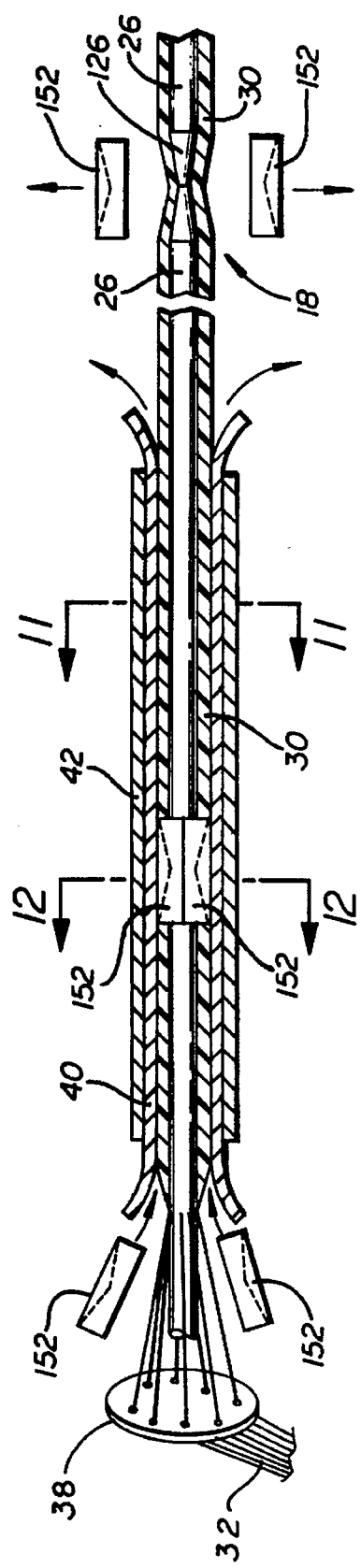
FIG. 10 is a schematic representation of a pultrusion machine corresponding generally with FIG. 5, and illustrating use of the external mold members of FIG. 9.
Figure 12:
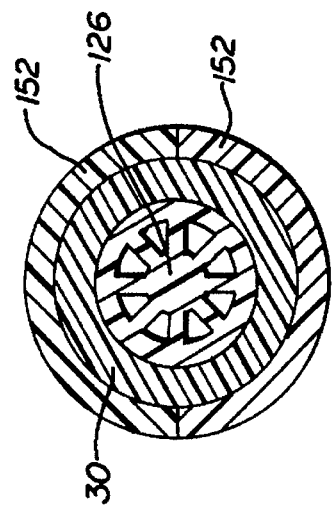
FIG. 12 is a sectional view taken generally along the line 12—12 of FIG. 10.
Figure 11:
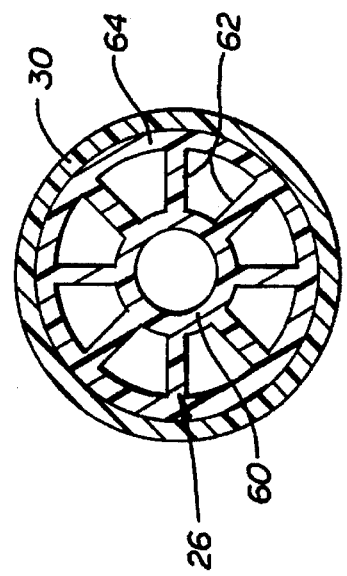
FIG. 11 is a sectional view taken generally along the line 11—11 of FIG. 10.

The irregular core section 126 is associated with the modified external mold members 152 to shape the outer surface of the resultant load-bearing rod 18 into the irregular profile. FIG. 9 shows the mold members 152 in the form of a pair of mold shells of semicircular cross section each having a concave inner face 154 which essentially mirrors the outer profile shape of the filler core 126. As shown in FIG. 10, the pair of mold shells 152 are inserted into the pultrusion die tube in a position about the resin coated fibers 32, whereby the mold shells enclose and surround the rod-forming components. The mold shells 152 define a smooth-surfaced exterior to ride smoothly through the die tube 40, for purposes of shaping the fibers 32 in conformance with the outer surface of the filler core 126 and the faces 154 of the mold shells. In accordance with one aspect of the invention, these shaping surfaces are designed to maintain the cross sectional area of the resultant fiber-resin jacket 30 substantially constant for the entire length of the rod 18. Accordingly, the radial thickness of the jacket 30 is shaped by the core 126 and mold shells 152 to increase as an inverse function of localized jacket diameter, as depicted in FIGS. 11 and 12.

At the exit end of the pultrusion tube 40, the mold shells 152 are quickly and easily removed from the rod 18, as shown in FIG. 10. The rod 18 can then be subjected to further processing, such as molding of the reinforcing tip 20 and the grip 22 thereon.

Figure 13:
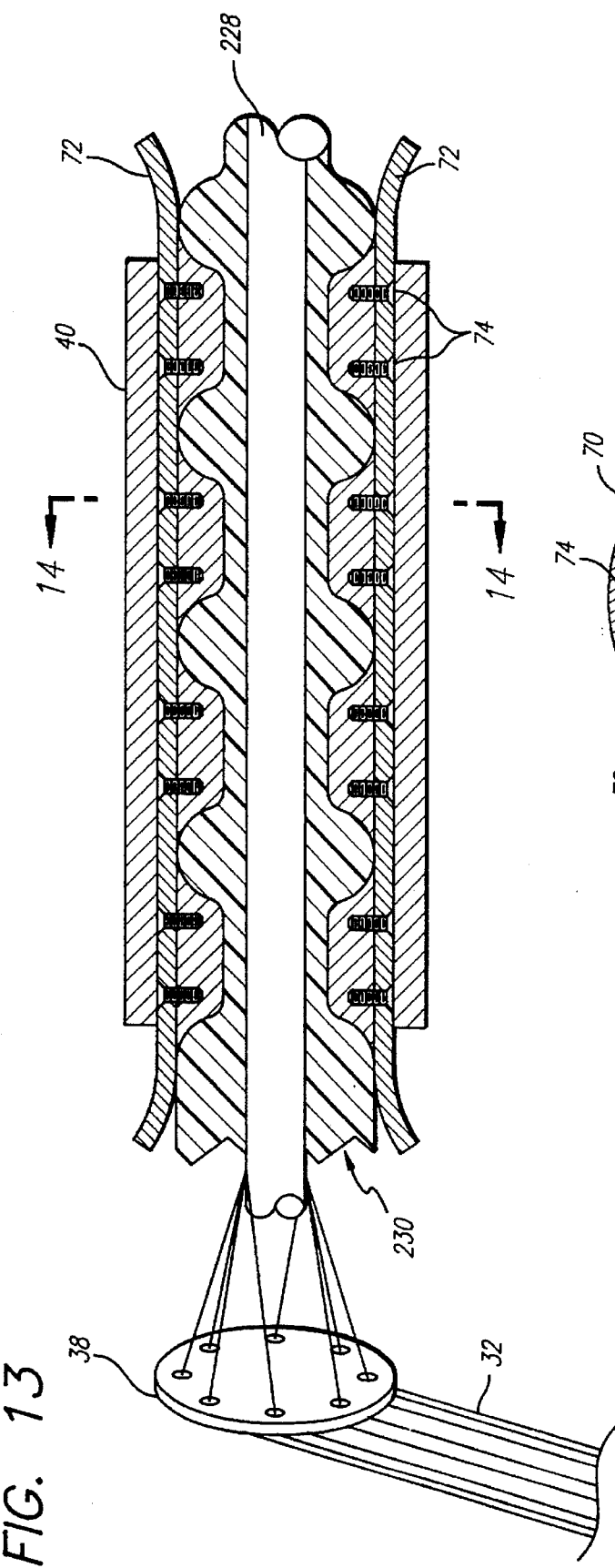
FIG. 13 is a schematic representation of a pultrusion machine corresponding generally with FIGS. 5 and 10, and illustrating use of external mold members removably connected to oppositely facing belts which are guided through tracks provided in the die tube.
Figure 14:
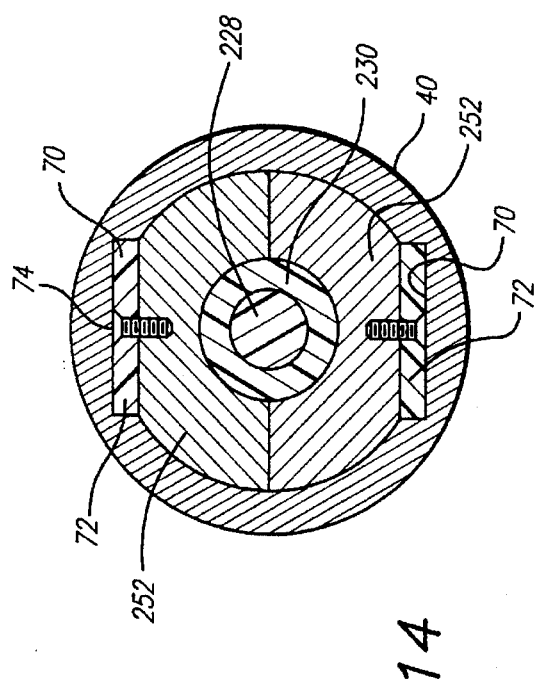
FIG. 14 is a sectional view taken generally along the line 14—14 of FIG. 13.
Figure 15:
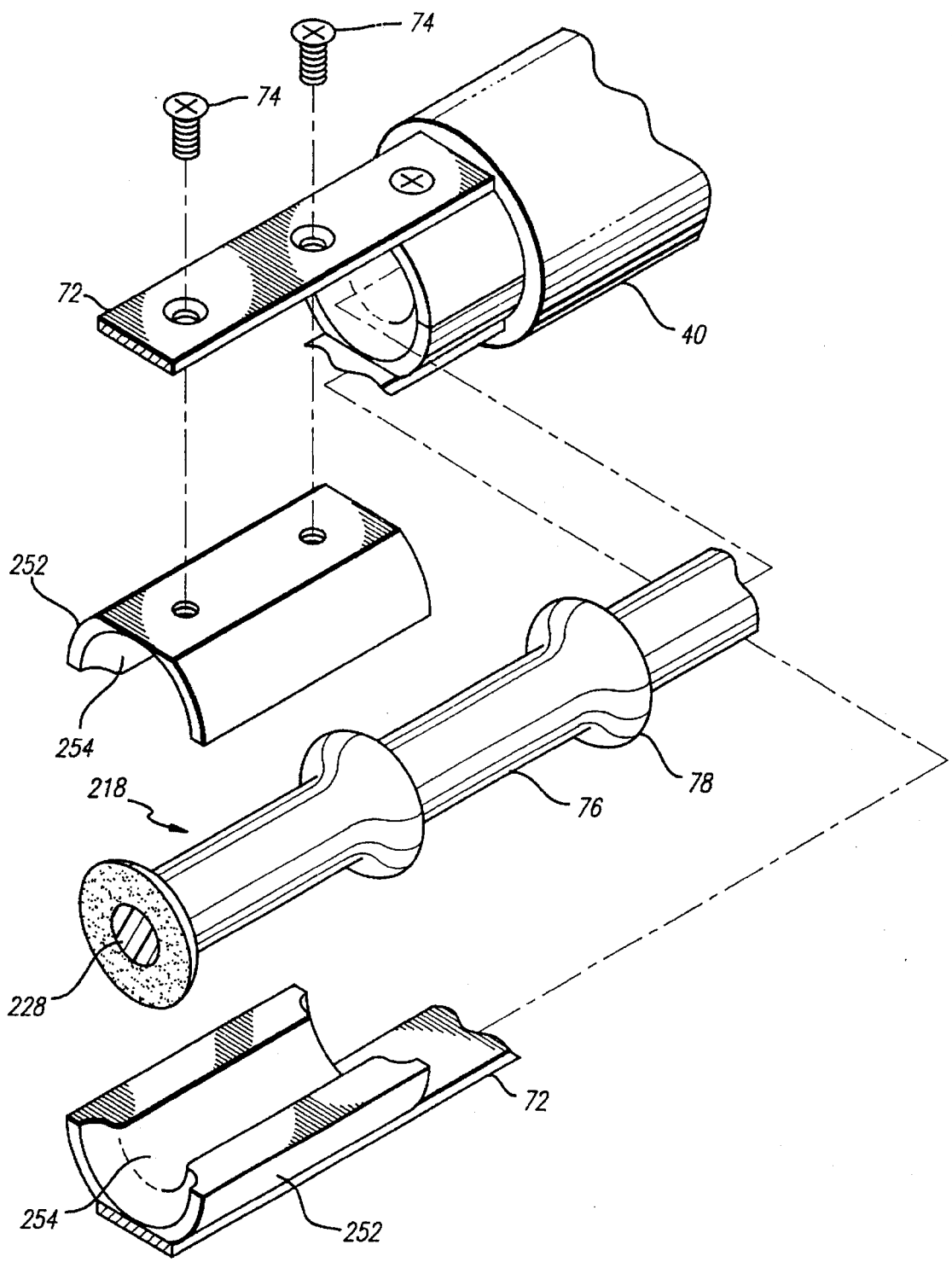
FIG. 15 is an exploded and partially fragmented perspective view showing assembly of the external mold members shown in FIGS. 13 and 14 to their respective belts, and further showing the resultant manufactured composite rod.

FIGS. 13–15 illustrate another type of modified external mold members 252 which are channeled through the pultrusion die tube 40 to impart a selected irregular profile shape to the outer surface of the load-bearing jacket 30 of the rod 18. Again, for sake of convenience and ease of description, components generally conforming to those shown and described with respect to FIGS. 1–7 will be identified by the same reference numbers.

More specifically, FIGS. 13–15 show a reinforcing core 228 adapted for insertion as previously described into the pultrusion die tube 40, with the resin coated fibers 32 channeled into the die tube in surrounding relation to the core 228. Although a reinforcing core 228 is illustrated, a lightweight filler core 26 could be utilized as well.

The die tube 40 includes a pair of oppositely facing, generally rectangular channels 70 adapted to receiving a respective belt 72 to which the external mold members 252 are attached by means of screws 74 or the like. The external mold members 252 are attached in corresponding locations to the belts 72 to form corresponding pairs of mold shells of semicircular cross-section each having a concave inner face 254. When attached to the belts 72, the mold members 252 and the belts 72 form traveling dies which are guided through the die tube 40 through tracks provided by the channels 70.

Corresponding pairs of the mold members 252 are inserted into the pultrusion die tube 40 in a position about the resin coated fibers 32, whereby the mold shells enclose and surround the rod-forming components. FIGS. 13–15 illustrate, in particular, the manufacture of re-bar, commonly used in concrete reinforcing applications. In this case, the resultant load bearing rod 218 includes alternating sections of a relatively small cross-sectional diameter 76 and relatively large cross-sectional portions or flanges 78. The nature of the resin coated fiber material 32 passing through the die tube 40 permits the resin to hydraulic out of the reduced diameter portion 76 and into the enlarged portions or flanges 78 where, as shown, there is a large discrepancy in the cross-sectional areas of the adjacent portions of the load bearing rod 218. Importantly, the fiber material 32 within the resultant fiber-resin jacket 230 is not broken or cut, thereby maintaining the structural integrity thereof.

Exceptional test results have been achieved by employing the manufacturing processes of the present invention. The tool handle 10 provides significantly increased tensile and flexural strength without increasing the weight of the handle, and the manufacturing process permits use of low-cost fiber and resin materials, thus minimizing the costs of manufacture. It will be appreciated that cross-fibers are not necessary to increase the interlaminar and hoop strength of the tool handle 10, but rather the advantages of the present invention, and the significant increase in flexural strength of the tool handle 10, can be achieved while utilizing unidirectional fibers during a pultrusion process. By providing the irregular profiles on the outer surfaces of the cores 26 and 28 and/or the fiber-resin jacket 30, which permit key-locking together of the facing layers of the composite tool handle 10, the handle's resistance to shear failure through the resin in a direction perpendicular to the applied load is significantly greater in comparison with prior composite tool handles.

From the foregoing, it should be apparent that there are at least three ways of providing a traveling die to make the depressions or configurations in the outer surface of the fiber-resin jacket 30, 230. One way is to utilize a sacrificing material which has as its upper surface a smooth surface that either of its own material and/or an additive of mold release, allows the traveling die to slide smoothly throughout the stationary die while the undersurface has the configuring shape required for the pultrusion. A second such process includes a long or continuous molded belt of a material such as teflon with one side configured to slidably engage the stationary die, and an inner face providing a concave mold face 54 configured to the final shape of the desired pultruded article. Such a traveling die would either be made in a large single loop and reenter the die on a continuous tractor tread-like action, or in a long belt which can be coiled up an re-run through the die at convenience. A third process utilizes die segments or external mold members 252 removably mounted on an endless thin tape or belt 72, such as stainless steel, so that the end of the traveling die, as a tractor tread, can peel off from the pultrusion as its exits the stationary die 40.

Moreover, it will be appreciated that it is not necessary that the cores 26 and 28 maintain their structural integrity during the manufacturing process. For example, if a relatively deep depression is required for a given product at any frequency along the length of the pultruded article, the mold members 152 provided to create the deep depression may actually crush a portion of the lightweight filler core 126 at the location adjacent to the mold members without impairing the utility of the resultant pultruded article.

Although several embodiments of the invention have been described in detail for purposes of illustration, various modifications may be made without departing from the spirit and scope of the invention. Accordingly, the invention is not to be limited, except as by the appended claims.

I claim:

1. A process for manufacturing a composite rod assembly that may be used, for example, as a tool handle, the steps comprising:

feeding a core into a pultrusion die tube;

surrounding the core with resin coated fibers;

inserting at least one external mold member having a mold face defining an irregular profile shape into a space between the resin coated fibers and the die tube;

pulling the core through the pultrusion die tube while keeping the core surrounded by the resin coated fibers;

drawing the at least one external mold member through the die tube with the resin coated fibers and the core; and curing the resin coated fibers around the core to form a fiber-resin jacket having an outer surface conforming to the irregular profile shape of the mold face.

2. The process of claim 1, including the steps of feeding a core having an irregular profile shape into the pultrusion die tube, and curing the resin coated fibers around the core to form a fiber-resin jacket having an inner surface which conforms to the irregular profile shape of the core to key-lock the fiber-resin jacket to the core.

3. The process of claim 1, including the step of molding a secondary jacket over at least a portion of the outer surface of the fiber-resin jacket, whereby an inner surface of the secondary jacket conforms to the outer surface of the fiber-resin jacket to key-lock the secondary jacket to the fiber-resin jacket.

4. The process of claim 3, wherein the secondary jacket includes a reinforcing tip molded onto the fiber-resin jacket to strengthen the rod assembly at one end thereof.

5. The process of claim 4, wherein the secondary jacket includes a grip molded onto the fiber-resin jacket adjacent to the reinforcing tip.

6. The process of claim 1, wherein the step of feeding a core into a pultrusion die tube includes the steps of alternately feeding sections of lightweight filler core and relatively strong reinforcing core into the die tube.

7. The process of claim 1, including the step of forming the outer surface of the fiber-resin jacket to have a corrugated profile shape.

8. The process of claim 7, including the step of molding a secondary jacket over at least a portion of the outer surface of the fiber-resin jacket, whereby an inner surface of the secondary jacket conforms to the outer surface of the fiber-resin jacket to key-lock the secondary jacket to the fiber-resin jacket.

9. The process of claim 8, wherein the corrugations in the corrugated profile shape are in a sinusoidal configuration.

10. The process of claim 9, wherein each corrugation of the sinusoidal configuration is about 0.030 inch deep and about 1.125 inch long.

11. The process of claim 1, including the step of removing the at least one external mold member from the rod assembly at an exit end of the die tube.

12. The process of claim 1, wherein the at least one external mold member cooperates with the core to form the fiber-resin jacket with a substantially uniform cross sectional area along the length of the rod assembly.

13. The process of claim 1, wherein the at least one external mold member comprises a plurality of mold members cooperatively surrounding the resin coated fibers within the die tube.

14. The process of claim 1, wherein the at least one external mold member is attached to a belt that is drawn through the die tube during the drawing step.

15. The process of claim 14, wherein the belt is formed in a continuous loop.

16. The process of claim 14, wherein the at least one external mold member is detachable from the belt.

17. The process of claim 14, including the step of guiding the belt through a track within the die tube during the drawing step.

18. A process for manufacturing a composite rod assembly that may be used, for example, as a tool handle, the steps comprising:

feeding resin coated fibers into a pultrusion die tube;

inserting at least one external mold member having a mold face defining an irregular profile shape into a space between the resin coated fibers and the die tube;

drawing the at least one external mold member through the die tube with the resin coated fibers;

curing the resin coated fibers within the die tube to form a cured fiber-resin rod having an outer surface conforming to the irregular profile shape of the mold face; and molding a jacket over at least a portion of the outer surface of the cured fiber-resin rod, whereby an inner surface of the jacket conforms to the outer surface of the cured fiber-resin rod to key-lock the jacket to the cured fiber-resin rod.

19. The process of claim 18, including the step of forming the outer surface of the cured fiber-resin rod to have a corrugated profile shape.

20. The process of claim 19, wherein the corrugations in the corrugated profile shape are in a sinusoidal configuration.

21. The process of claim 20, wherein the jacket includes a reinforcing tip molded on the cured fiber-resin rod to strengthen the rod assembly at one end thereof.

22. The process of claim 21, wherein the jacket includes a grip molded onto the cured fiber-resin rod adjacent to the reinforcing tip.

23. The process of claim 18, wherein the at least one external mold member comprises a plurality of mold members cooperatively surrounding the resin coated fibers within the die tube.

24. The process of claim 18, wherein the at least one external mold member is attached to a belt that is drawn through the die tube during the drawing step.

25. The process of claim 24, wherein the belt is formed in a continuous loop.

26. The process of claim 24, wherein the at least one external mold member is detachable from the belt.

27. The process of claim 24, including the step of guiding the belt through a track within the die tube during the drawing step.

28. A process for manufacturing a composite rod assembly that may be used, for example, as a tool handle, the steps comprising:

feeding a core into a pultrusion die tube;

surrounding the core with resin coated fibers;

inserting a belt which supports at least one external mold member having a mold face defining an irregular profile shape into a space between the resin coated fibers and the die tube;

pulling the core through the pultrusion die tube while keeping the core surrounded by the resin coated fibers;

drawing the belt through the die tube with the resin coated fibers and the core; and curing the resin coated fibers around the core to form a fiber-resin jacket having an outer surface conforming to the irregular profile shape of the mold face.

29. The process of claim 28, including the step of guiding the belt through a track within the die tube during the drawing step.

30. The process of claim 28, wherein the at least one external mold member is detachable from the belt.

31. The process of claim 30, wherein the belt is formed in a continuous loop.

32. The process of claim 31, wherein the at least one external mold member comprises a plurality of mold mem bers cooperatively surrounding the resin coated fibers within the die tube.

33. The process of claim 29, wherein the at least one external mold member cooperates with the core to form the fiber-resin jacket with a substantially uniform cross sectional area along the length of the rod assembly.

34. The process of claim 29, including the step of molding a secondary jacket over at least a portion of the outer surface of the fiber-resin jacket, whereby an inner surface of the secondary jacket conforms to the outer surface of the fiber-resin jacket to key-lock the secondary jacket to the fiber-resin jacket.

35. The process of claim 34, including the step of forming the outer surface of the fiber-resin jacket to have a corrugated profile shape.

36. The process of claim 35, wherein the corrugations in the corrugated profile shape are in a sinusoidal configuration.

37. The process of claim 34, including the steps of feeding a core having an irregular profile shape into the pultrusion die tube, and curing the resin coated fibers around the core to form a fiber-resin jacket having an inner surface which conforms to the irregular profile shape of the core to key-lock the fiber-resin jacket to the core.

* * * * *